United States Patent [19]
Jacobsen et al.

[11] Patent Number: 6,031,458
[45] Date of Patent: Feb. 29, 2000

[54] POLYMERIC RADIO FREQUENCY RESONANT TAGS AND METHOD FOR MANUFACTURE

[75] Inventors: Soren Jacobsen, Gislev; John Engell; Jorgen Schjerning Lundsgaard, both of Svendborg; David Morgan Thomas, Stenstrup, all of Denmark

[73] Assignee: IRD/AS, Svendorg, Denmark

[21] Appl. No.: 09/131,105

[22] Filed: Aug. 7, 1998

[30]     Foreign Application Priority Data

Aug. 8, 1997 [DK]   Denmark ................................ 0911/97

[51] Int. Cl.$^7$ ................................... G08B 13/14
[52] U.S. Cl. .................... 340/572.5; 340/572.1; 343/873; 343/895
[58] Field of Search .............................. 340/572.1, 572.3, 340/572.4, 572.5, 572.6, 571, 568.1; 343/873, 872, 895

[56]     References Cited

U.S. PATENT DOCUMENTS

| | | | |
|---|---|---|---|
| 4,830,939 | 5/1989 | Lee et al. ................................. | 429/192 |
| 4,929,928 | 5/1990 | Hultaker ................................... | 350/572 |
| 4,970,495 | 11/1990 | Matsumoto et al. .................. | 340/572.1 |
| 5,142,270 | 8/1992 | Appalucci et al. ...................... | 340/572 |
| 5,241,299 | 8/1993 | Appalucci et al. ...................... | 340/572 |
| 5,608,417 | 3/1997 | De Vall ................................. | 340/572.1 |
| 5,645,932 | 7/1997 | Uchibori ............................... | 340/572.1 |
| 5,734,327 | 3/1998 | Batterink et al. ..................... | 340/572.1 |
| 5,912,622 | 6/1999 | Endo et al. ........................... | 340/572.5 |

FOREIGN PATENT DOCUMENTS

| | | |
|---|---|---|
| 070317B1 | 1/1982 | European Pat. Off. . |
| WO 95/05647 | 2/1995 | WIPO . |

OTHER PUBLICATIONS

Kingery et al., "Introduction to Ceramics", (Introduction to Ceramics, 2nd Ed. ISBN 0–0471–47860–1 (John Wiley & Sons, Inc. New York, USA.

Primary Examiner—Nina Tong
Attorney, Agent, or Firm—Law Offices of Jane Massey Licata

[57]     ABSTRACT

The present invention provides polymeric radio frequency resonant tags and methods of manufacturing these tags for use in detection of theft of article for sale.

14 Claims, 1 Drawing Sheet

POLYMERIC RADIO FREQUENCY RESONANT TAGS AND METHOD FOR MANUFACTURE

INTRODUCTION

This application claims priority from Danish provisional application number, 0911//97 filed Aug. 8, 1997.

FIELD OF THE INVENTION

The present invention relates to a polymeric radio frequency resonant tag for protection of articles of sale from theft and a method for manufacturing the polymeric radio frequency resonant tag. The polymeric radio frequency resonant tag is applied by conventional printing or digital printing methods to the item of sale. The tag is manufactured from an inductive element comprised of first and second conductive patterns of polymer based electronically conducting paint or ink each connected to a capacitor electrode and separated by a dielectric film. A weak or fusible link in the first or second conductive pattern of the inductive element enables de-activation. The polymeric radio frequency resonant tag is sequentially manufactured by applying and adhering layers to a substrate, preferably the article of sale, by a bonding and cross-linking process wherein polymeric binders of each layer are chemically reacted.

BACKGROUND OF THE INVENTION

A similar multiple frequency tag is described by Kajfez et al. in WO 95/05647. The multiple frequency tag described by Kajfez et al. is comprised of a dielectric substrate. A first resonant circuit including a first inductor coil and having a first predetermined resonant frequency is located on the first surface of the substrate. A second resonant circuit including a second inductor coil and having a second predetermined resonant frequency which preferably is different from the first predetermined resonant frequency is located on the second surface of the substrate. The first inductor coil is positioned on the substrate to partially overlay the second inductor coil in a manner which minimizes the magnetic coupling between the first and second coils. The tag may be employed in any type of detection system including an electronic article security system for protecting articles of sale from theft. Tags of this kind are manufactured by lamination of aluminum foils on a dielectric substrate. This substrate is subsequently printed and etched to form the resonant coils and then coated with adhesive and a protective strippable cover. It is then cut to size and shape.

A corresponding manufacturing process for a similar resonant tag to be utilized for the same purpose has been disclosed by Imaichi et al. in EP 070318 B1.

The resonant circuits described by Kajfez et al., have an advantage in that they are difficult to deactivate and cannot be destroyed by magnets. However, the etching step for manufacture of these devices requires the precise printing of a non-etchable ink so that only the exposed areas of the aluminum foil are removed by etching. The uncertainties of this process combined with the unavoidable variations in dielectric thickness combine to make the process for production of these multiple frequency tags complex and undesirably expensive. Furthermore, this method of manufacture produces many tags with defective responses due to the resonant frequency being outside reasonable limits of variation.

Hultaker in U.S. Pat. No. 4,929,928 discloses the application of an ink comprising magnetizable particles to a theft protection device. However, the use of magnetizable particles as a means of theft prevention is easily obviated by a thief who has the means for destroying the magnetic properties of the device, for example, by applying a magnet.

Appalucci et al., in U.S. Pat. No. 5,142,270 and U.S. Pat. No. 5,241,299, describe a stabilized resonant tag circuit and deactivator for use in an electronic article surveillance system. The tag disclosed in these patents has a substantially planar dielectric substrate having conductors placed on either side where at least one of the conductors includes an inductor. The tag is stabilized by a flexible, substantially planar, tear-resistant, polymeric film adhered to and covering one of the conductors and the substrate. The film provides a vapor barrier which minimizes the effects of body detuning on the circuit and promotes the secured integrity of the tag. The tag may further comprise a deactivator for deactivating the tag in response to an electromagnetic field of sufficient energy to destroy the resonant properties of the circuit, the deactivator being an indented portion of at least one of the conductors such that the conductors are closer to each other at the indented portion than at the remainder of the conductor. The conductors of this device are made of a metallic conductor material such as aluminum foil and prepared using an extrusion coating process not described. The polymeric film which adheres to the conductors and the substrate provide mechanical stability, while the covering polymeric film provides a thin layer impervious to water vapor or other contaminants which may alter the resonating frequency.

In the present invention, radio frequency resonant tags comprising polymeric materials in the entirety are provided which are manufactured via a quick and reliable process with limited variability to be deactivated only when exposed to a strong electromagnetic field at a selected resonant frequency.

SUMMARY OF THE INVENTION

An object of the present invention is to provide a polymeric radio frequency resonant tag comprising: a first conductive pattern connected to a first capacitor electrode applied to a substrate; a dielectric film applied to the first conductive pattern and first capacitor electrode; and a second conductive pattern connected to a second capacitor electrode applied to dielectric film, wherein said first and second conductive patterns are connected to form an inductive element. Alternatively, the dielectric film is replaced at the region intended to form a contact electrode via a local capacitor with a capacitor composite applied to the first capacitor electrode and a dielectric film located adjacent to the capacitor composite and applied to the first conductive pattern. The polymeric radio frequency tag of the present invention may further comprise an insulation layer between said first conductive pattern and first capacitor electrode and a substrate and a covering layer applied to the second conductive pattern and second capacitor electrode.

Another object of the present invention is to provide a method of manufacturing a polymeric radio frequency resonant tag which comprises applying a first conductive pattern layer connected to a first capacitor electrode onto a substrate; applying a dielectric film layer onto the first conductive pattern and first capacitor electrode; applying a second conductive pattern layer connected to a second capacitor electrode onto the dielectric film so that the first conductive pattern and the second conductive pattern form an inductive element; and crosslinking or bonding said layers and substrate. Alternatively, the dielectric film is replaced at the region intended to form a contact electrode via a local capacitor with a capacitor composite applied to the first capacitor electrode and a dielectric film located adjacent to the capacitor composite and applied to the first conductive pattern. The method of the present invention may further comprise applying an insulation layer between the first conductive pattern and the substrate and concealing the tag on the substrate to protect the inductive element.

DETAILED DESCRIPTION OF THE INVENTION

Figure 1:
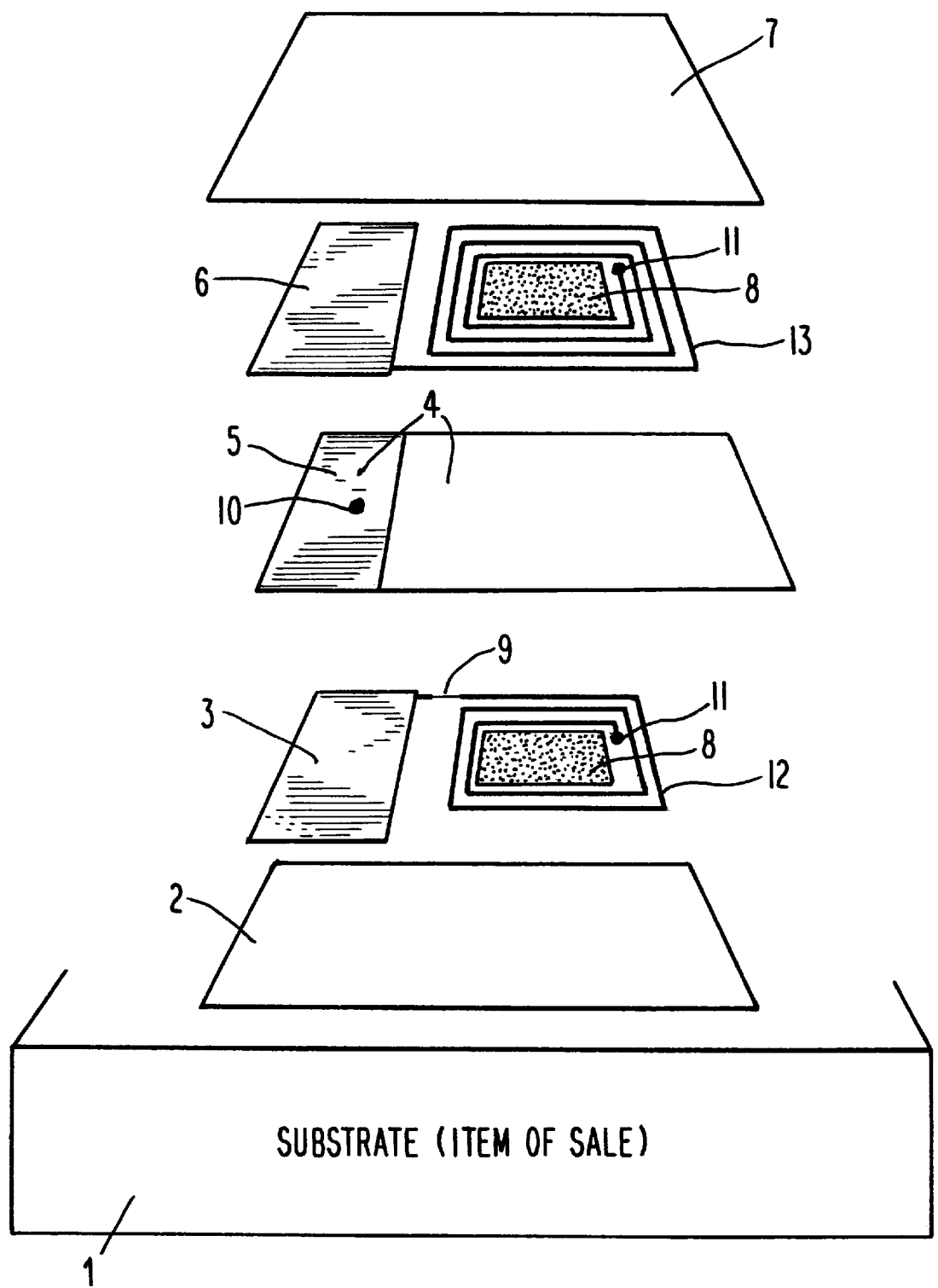
FIG. 1 shows a schematic side view of the layers which comprise a preferred embodiment of polymeric radio frequency resonant tag of the present invention.

A quick and reliable process has now been developed to manufacture reliable resonating RLC circuitry with limited variability in the resonance frequency, comprising a Resistance (R), an inductance (L) and a capacitance (C) connected in series. This process can be used in the manufacture of resonant tags of well defined RLC resonance. The process of the present invention allows the printing of the circuits without the use of chemical etching, extrusion of foils, or stamping of foils, and also allows less restraint in the form of the circuitry so that irregular shapes may be used to conceal the device in other typographical features thereby reducing the risk of malicious damage to or removal of the device.

In this process, a first conductive pattern is prepared from an electronically conducting paint or ink and connected to a first capacitor electrode. A conductive paint or ink suitable for this purpose can be manufactured by mixing electronically conductive particulate materials in a polymeric binder. The polymeric binder may be selected from any polymeric material in which the transformation from low molecular weight precursor liquid or plastic form to a solid form consisting of three-dimensionally chemically bonded precursors can be effectuated by a polymerization process. A further criteria is that the polymeric binder must be compatible with and adherable to the substrate. Paints or inks with these characteristics are commercially available from DuPont Electronics of TÄBY Sweden as CB polymer thick film pastes. For example, CB210 Copper-conductor Polymer Thick Film paste, is particularly suitable for use on flexible substrates. Alternatively, paints or inks can be manufactured by compounding finely divided electrically conductive materials, such as metal powder, conductive carbon-black or graphite, in a resin base to yield a electrically conductive paint with good adhesive properties.

A dielectric film and/or a capacitor composite is then applied, followed by application of a second conductive pattern, similar to the first, connected to a second capacitor electrode so that the first and second conductive patterns connect to form an inductive element. A weak or fusible link in the first or second conductive pattern of the inductive element enables de-activation. The whole assembly of polymeric layers is sequentially manufactured by applying and adhering the layers onto the substrate, for example the article of sale, by a bonding and cross-linking process.

Capacitor composites and dielectric films can be applied to the first conductive pattern separately as polymer bonded composites located adjacent to one another. Where high capacitance is required composite materials can be used. However, as known to those versed in the art, simple polymeric materials may have suitable dielectric properties to provide the necessary capacitance. Such materials are referred to herein as "dielectric films". Suitable composite materials are known in the literature and by people versed in the art. For example, Kingery et al., (*Introduction to Ceramics*, 2nd Ed. ISBN 0-0471-47860-1 (John Wiley & Sons, Inc. New York, USA) describe ferro-electric materials of the perovskite class, such as barium titanate strontium titanate, barium-strontium titanate or lead titanate which can be exploited to manufacture capacitors with high dielectric constants for use as laminar capacitors. These materials can be incorporated into polymers films or paints. Alternatively, they can be extruded or made by tape casting and subsequently sintered to produce rigid capacitative materials. Alternatively, the material can be applied as a fluid mixture with a liquid curable polymer as the matrix. The volume content of the disperse phase, which is the material with the highest dielectric constant, and the thickness of the film deposited determine the value of the capacitance obtained. These materials have a wide variation with respect to the volume content of Barium, Strontium or Lead titanate content. Rheological considerations limit the maximum volume fraction of titanate to below 70 volume %. For pastes capable of coating to a thickness of 10 to 50 microns, a solids content of approximately 60 volume % is optimal.

A polymeric electrically insulating dielectric film and/or a capacitor composite may be applied by various methods known by those skilled in the art. Such methods may involve calendered or extruded laminar sheets, doctor blade coating methods, printing or by digitally controlled ink-jet printing devices. Other methods involve coalescing a polymerically bound powdered form of the material which subsequently may be melted by the application of heat into a non-porous film directly onto the previously applied conductive pattern using a digitally controlled laser printer device.

The use of digital printing techniques and calculation software allows the form of the inductive elements to be modified at will so that these may be optionally integrated into typographical features.

On the other surface of the dielectric film and/or and capacitor composite a second conductive pattern connected to a second capacitor electrode can be applied and connected via a perforation in the dielectric film to the first conductive pattern so that the whole assembly forms a resonant RLC type circuit of well defined resonant frequency.

The assembly of polymeric layers is then cross-linked and bonded together and to the substrate by conventional means, for example, via the application of heat or by ultraviolet radiation. Both methods have advantages but have limiting constraints due to demands of thermal stability and/or transparency. Preferably, a method of accelerated processing is used so that production of the tag is consistent in speed at each stage in the process. This may be carried out by means of the creation of chemically active free-radicals by utilizing high-intensity radiation such as ultra-violet light, gamma radiation or by electron beams as taught by in U.S. Pat. No. 4,830,939.

The present invention also relates to a polymeric radio frequency resonant tags for protection of consumer retail goods from theft. The polymeric radio frequency resonant tag is applied directly to an item via conventional screen printing or digital printing methods.

A polymeric radio frequency resonant tag of the present invention is depicted in FIG. 1. As shown in FIG. 1, the polymeric radio frequency resonant tag comprises a series of layers 3–7 applied to a substrate 1, preferably the cardboard packaging or tag of an article of sale. Where the substrate 1 has unsuitable electric properties an optional first insulating layer 2 which comprises an adherent insulating material, preferably dielectric CB018 UV from DuPont de Nemours or polyisobutylene, supplied as Vistanex M obtainable from Exxon Chemicals International, Mechelsesteenweg 363 B.1950 Kraainem, Belgium is included in the device. Alternatively polyethylene, polyvinyl chloride or a polyester such as Melinex, available from ICI, Millbank, London, United Kingdom or Mylar supplied by DuPont de Nemours, 52 Rte des Acacias, Geneva, Switzerland can be used. The insulating layer 2, when included, stabilizes the substrate 1 and promotes adhesion to the subsequent layers 3–7 to be applied and to the substrate 1. A first conductive pattern 12 is connected to a first capacitor electrode 3 and is applied either directly to a substrate 1 or to the optional insulation layer 2, followed by a capacitor composite 5 and a dielectric film 4 located adjacent to the capacitor composite 5 and a second conductive pattern 13 connected to a second capacitor electrode 6 which is applied to the capacitor 5 and dielectric 4 composites. The dielectric film 4 and capacitor composite 5 provide another layer of insulation and a capacitance to the circuit formed when the first 12 and second 13 conductive patterns are joined and connected through a perforation 11 in this layer 4,5 thereby producing an inductive element. Alternatively, a dielectric film 5 only is applied as a single polymeric composite with suitable dielectric properties to provide the necessary capacitance across the entire first conductive pattern 12 and first capacitor electrode 3.

In a preferred embodiment, a weak or fusible link 9 is included within the first 12 or second 13 conductive pattern to enable deactivation by applying an electromagnetic field to the fusible link constriction at a selected resonant frequency. In a preferred embodiment, the selected frequency of deactivation is 8.2 MHZ as used in conventional antenna technology. A deactivation spot 10 is preferably included in the dielectric film or capacitor composite for ease in identifying the most effective placement of the deactivation device. The deactivation spot 10 comprises a small region in the dielectric composite having a lower breakdown potential to facilitate deactivation of the device.

The first 12 and second 13 conductive patterns comprise electronically conductive composite pastes. The inductance of these coil elements may optionally use conventional techniques providing a ferro-magnetic core. The inductance may be enhanced by applying a ferrite composite material 8 in the open center portion of the conductor coil. Materials that are suitable can be manufactured by mixing together a binder polymer such as CB018 UV curable dielectric and ferrite material which is conventionally used in similar applications in electronics as is well known by those versed in the art. Alternatively Ferrite Powder Composites (FPC) manufactured by Siemens, Federal Republic of Germany may be used.

The dielectric composite 4 is an electrically insulating polymeric material such as may be used for the insulation layer 2.

The capacitor composite 5 may be the same material as is used for the dielectric layer 4. It is preferred that the capacitor composite 5 comprises a polymer bound ferroelectric composite mixture containing a dielectric polymer such as CB018 UV curable dielectric and a ferro electric ceramic material, preferably hydrothermally prepared barium titanate or hydrothermally prepared strontium titanate, barium-strontium titanate or lead titanate having a volume fraction content of the ferro-electric ceramic material between 20 and 70 volume %.

The whole assembly may be concealed on packaging by being covered with a non shielding or covering layer 7 such as graphic art.

The following non-limiting examples are provided to further illustrate the present invention.

EXAMPLES

Example 1

An adherent first insulating layer was initially applied by coating or printing an insulating material onto the cardboard surface of the article of sale which is to be protected. A suitable material for the first insulating layer is a polyurethane-Epoxide lacquer Lötstopplack UV/L4-F (Coates Screen Inks GmbH, Mainstrasse 99, D.90451 Nurenberg, Federal Republic of Germany) which promotes adhesion to the subsequent layers to be applied and to its substrate. This material was cured by Electron Beam curing in a Curetron EBC-200-AA# machine (Nissin High Voltage, Japan) at a rate of 3 meters per minute at 190 kV and a current of 3 mA.

The first conductive pattern comprised silver based Electrodag 820B conductive printable ink (Acheson Colloids Company, Plymouth, United Kingdom) which was applied onto the underlying coated substrate via screen printing using conventional screen printing techniques. After application of the first conductive pattern, the assembly was dried at 150° C. for 5 minutes before the next step.

In this embodiment, the first conductive pattern was formed as a spiral wound, 4 revolution, quadratic coil segment connected at one end to a quadratic contact area which is intended to form a contact electrode in a local capacitor. The conductor had a width of 1500 $\mu$m and a thickness of 35 $\mu$m. The quadratic coil had the form of a 55 mm square pattern and terminates at a connecting point intended to provide a jump connector to a second conductive pattern to be applied subsequently.

The subsequent layers were applied in sequence and dried in a similar manner to the previous layer at 150° C. for 5 minutes. An insulating dielectric composite layer was applied onto the upper surface of the coil segment. The dielectric composite can be applied digitally or by screen printing and is comprised of a UV/L4-F curable dielectric medium. This product produced a dielectric composite layer with a thickness of 100 $\mu$m.

A capacitor composite layer with a dielectric constant of 5 was then applied to the capacitor electrode surface using similar transfer techniques. A composite material used in this embodiment consists of a mixture of powder dispersed in UV/L4-F curable dielectric medium. 5 volumes of barium titanate powder were mixed into the dielectric medium and the material was applied by silk screen printing. However, as will be obvious to those of skill in the art, any suitable method may be used which can control the thickness applied with the accuracy required.

The second conductive pattern consisting of Electrodag 820B forms the final segment of the inductive coil which is also connected to a corresponding capacitor electrode. This second segment has the same dimensions as the lower segment but the tracks do not superimpose one another so that the upper tracks lie above the space between the tracks in the lower segment.

The separation between the conductive patterns was equal to the width of the conductor and conductor thickness and was approximately 35 micrometers. Both segments of the conductive coil provide the conductive parts of an inductive coil having a self-induction.

Subsequently, the upper conductive pattern was applied to complete the inductive element. This segment was provided with a section of conductor width 500 μm to provide a fusible link which is capable of damage by providing a high intensity local field in order to dissipate sufficient power in the resonant device so as to fuse the link due to resistive heat at the point of highest impedance.

Light pressure using a dowel of radius 1.0 mm was then applied at the point of connection between the upper and lower layer to ensure adequate conduction between the upper and lower conductive segments forming the inductive coil. The assembly was finally covered with a dielectric medium UV/L4-F layer in order to hide and protect the inductive assembly. The whole assembly was Electron beam cured under the same conditions as applied to the first dielectric layer underlying the first conductive pattern (3 meter/minute, 190 kV, 3 mA in the Curetron machine).

The tags manufactured above had a resonant frequency of 8.2 MHZ and a Quality Factor Q exceeding 80 and thus are suitable for use in resonance detection devices conventionally used in the detection of theft.

Example 2

An inductive element was prepared in a manner similar to the techniques used in Example 1. The essential differences involved the use of a CB018 dielectric as the insulating layer on the substrate, between the upper and lower conductive patterns, and as a final cover. The capacitative material consisted of the same CB 018 dielectric. The lower conductor pattern consisted of a straight connector from the connector spot to the capacitor electrode of the lower conducting pattern. The upper conductive pattern comprised an 8 turn coil with the same thickness, width, and spacing as in Example 1.

The application procedures were analogue to those used in Example 1.

The tags manufactured above had a resonant frequency of 9.8 to 10.5 MHZ and a Quality Factor Q exceeding 60 and thus are suitable for use in resonance detection devices conventionally used in the detection of theft.

What is claimed is:

1. A polymeric radio frequency resonant tag comprising:
    a) a first conductive pattern connected to a first capacitor electrode applied to a substrate;
    b) a dielectric film applied to said first conductive pattern and first capacitor electrode; and
    c) a second conductive pattern connected to a second capacitor electrode applied to said dielectric film;
        wherein said first and second conductive patterns are connected to form an inductive element.

2. The polymeric radio frequency resonant tag of claim 1 further comprising an insulation layer located between said first conductive pattern connected to said first capacitor electrode and the substrate.

3. The polymeric radio frequency resonant tag of claim 1 further comprising a covering layer applied to said second conductive pattern and said second capacitor electrode.

4. The polymeric radio frequency resonant tag of claim 1 further comprising a fusible link constriction in the first conductive pattern or the second conductive pattern so that the polymeric radio frequency resonant tag can be deactivated by applying an electromagnetic field at a resonant frequency to the fusible link constriction.

5. A polymeric radio frequency resonant tag comprising:
    a) a first conductive pattern connected to a first capacitor electrode applied to a substrate;
    b) a capacitor composite applied to said first capacitor electrode;
    c) a dielectric film applied to said first conductive pattern and located adjacent to said capacitor composite; and
    c) a second conductive pattern connected to a second capacitor electrode applied to the capacitor composite and dielectric composite;
        wherein the first and second conductive patterns are connected to form an inductive element.

6. The polymeric radio frequency resonant tag of claim 5 further comprising an insulation layer located between said first conductive pattern and first capacitor electrode and the substrate.

7. The polymeric radio frequency resonant tag of claim 5 further comprising a covering layer applied to said second conductive pattern and second capacitor electrode.

8. The polymeric radio frequency resonant tag of claim 5 further comprising a fusible link constriction in the first conductive pattern or the second conductive pattern so that the polymeric radio frequency resonant tag can be deactivated by applying an electromagnetic field at a resonant frequency to the fusible link constriction.

9. A method of manufacturing a polymeric radio frequency resonant tag comprising:
    a) applying a first conductive pattern layer connected to a first capacitor electrode onto a substrate;
    b) applying a dielectric film layer onto said first conductive pattern layer and first capacitor electrode;
    c) applying a second conductive pattern layer connected to a second capacitor electrode onto the dielectric film so that the first conductive pattern and the second conductive pattern link to form an inductive element; and
    d) cross linking or bonding said layers and substrate to form a polymeric radio frequency resonant tag.

10. The method of claim 9 further comprising applying an insulation layer between said first conductive pattern layer and first capacitor electrode and the substrate.

11. The method of claim 9 further comprising concealing the tag on the substrate to protect the inductive element.

12. A method of manufacturing a polymeric radio frequency resonant tag comprising:
    a) applying a first conductive pattern layer connected to a first capacitor electrode onto a substrate;
    b) applying a capacitor composite layer onto said first capacitor electrode;
    c) applying a dielectric film layer onto said first conductive pattern layer adjacent to said capacitor composite layer;
    c) applying a second conductive pattern layer connected to a second capacitor electrode onto said capacitor composite and dielectric film layers so that said first conductive pattern and said second conductive pattern form an inductive element; and
    d) cross linking or bonding said layers and substrate to form a polymeric radio frequency resonant tag.

13. The method of claim 12 further comprising applying an insulation layer between said first conductive pattern layer and the substrate.

14. The method of claim 12 further comprising concealing the tag on the substrate to protect the inductive element.

* * * * *